US010059535B2

(12) United States Patent
Herman et al.

(10) Patent No.: US 10,059,535 B2
(45) Date of Patent: Aug. 28, 2018

(54) GRANULAR MATERIAL STORAGE WITH INPUT AND OUTPUT

(71) Applicant: Quickthree Solutions, Inc., Saksatoon (CA)

(72) Inventors: Alvin Herman, Saskatoon (CA); Erin Herman, Clavet (CA)

(73) Assignee: Quickthree Technology, LLC, Yardley, PA (US)

( * ) Notice: Subject to any disclaimer, the term of this patent is extended or adjusted under 35 U.S.C. 154(b) by 255 days.

(21) Appl. No.: 15/026,729

(22) PCT Filed: Oct. 16, 2014

(86) PCT No.: PCT/CA2014/000744
§ 371 (c)(1),
(2) Date: Apr. 1, 2016

(87) PCT Pub. No.: WO2015/054772
PCT Pub. Date: Apr. 23, 2015

(65) Prior Publication Data
US 2016/0236880 A1 Aug. 18, 2016

(30) Foreign Application Priority Data

Oct. 17, 2013 (CA) .................................. 2830145

(51) Int. Cl.
*B65G 65/42* (2006.01)
*B65G 65/32* (2006.01)
(Continued)

(52) U.S. Cl.
CPC ............. *B65G 65/42* (2013.01); *B65D 88/28* (2013.01); *B65D 88/30* (2013.01); *B65G 3/04* (2013.01);
(Continued)

(58) Field of Classification Search
CPC .... B65G 65/42; B65G 65/425; B65G 41/001; B65G 41/003
See application file for complete search history.

(56) References Cited

U.S. PATENT DOCUMENTS 1,327,436 A * 1/1920 Larson ................. B65G 41/003
198/861.5
1,461,707 A * 7/1923 Hanson ................ B65G 41/003
198/861.5
(Continued)

FOREIGN PATENT DOCUMENTS

WO 2013062968 A2 5/2013
WO 2014028316 A1 2/2014

OTHER PUBLICATIONS

International Search Report and Written opinion for PCT App. No. PCT/CA2014/000744 dated Apr. 23, 2015.

*Primary Examiner* — Jonathan D Snelting
(74) *Attorney, Agent, or Firm* — Sheehan Phinney Bass & Green PA

(57) ABSTRACT

A bulk storage and dispensing system has transportable silos releasably secured at bottom ends thereof to a fixed silo location on a site surface. A conveyor assembly is releasably secured to a fixed conveyor location on the site surface adjacent to the silos and includes a lower output conveyor, an upper input conveyor, a rigid upper frame, and a conveyor raising mechanism operative to raise the conveyor assembly from a lowered transport position to a raised operating position. The lower output conveyor receives granular material from each silo and discharges same at a desired location. The upper input conveyor receives granular material when in the raised operating position and directs same into each silo. Upper silo locks lock upper portions of the silos to the rigid upper frame of the conveyor assembly when the rigid upper frame is in the raised operating position.

27 Claims, 6 Drawing Sheets

(51) Int. Cl.
  *B65G 65/40* (2006.01)
  *B65D 88/28* (2006.01)
  *B65D 88/30* (2006.01)
  *B65G 3/04* (2006.01)
  *B65G 41/00* (2006.01)

(52) U.S. Cl.
  CPC ......... *B65G 41/001* (2013.01); *B65G 41/008* (2013.01); *B65G 65/32* (2013.01); *B65G 65/40* (2013.01)

(56) References Cited

U.S. PATENT DOCUMENTS

| | | | | |
|---|---|---|---|---|
| 3,314,557 | A * | 4/1967 | Sackett, Sr. | B28C 9/00 366/18 |
| 4,330,232 | A * | 5/1982 | McClaren | B65G 3/04 198/306 |
| 4,552,726 | A * | 11/1985 | Grappelli | C05F 17/0009 198/569 |
| 4,917,560 | A | 4/1990 | Marray et al. | |
| 6,293,689 | B1 | 9/2001 | Guntert et al. | |
| 9,776,813 | B2 * | 10/2017 | McMahon | B65G 63/008 |
| 2004/0154901 | A1 | 8/2004 | Kinzer | |
| 2006/0192041 | A1 | 8/2006 | Affleck et al. | |
| 2013/0142601 | A1 * | 6/2013 | McIver | B60P 1/6427 414/288 |
| 2014/0041317 | A1 * | 2/2014 | Pham | E21B 15/00 52/69 |

* cited by examiner

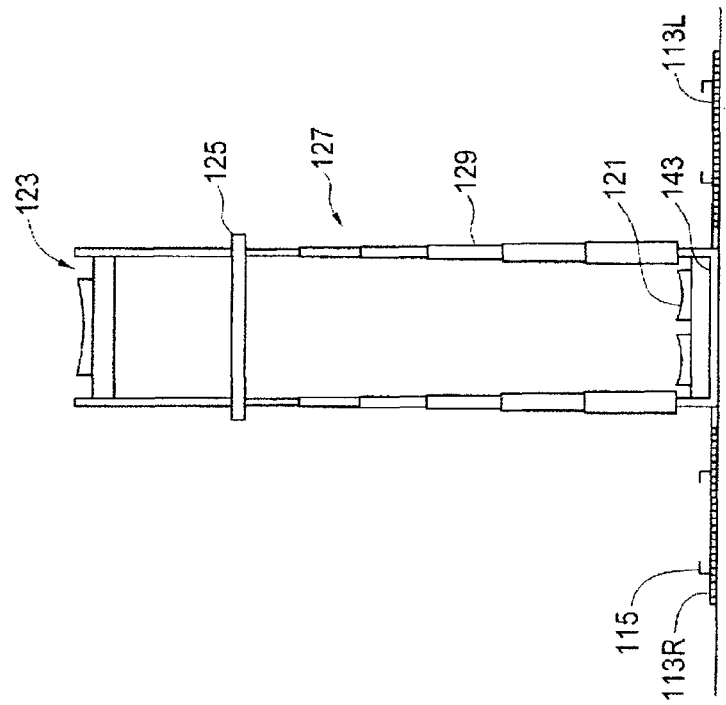
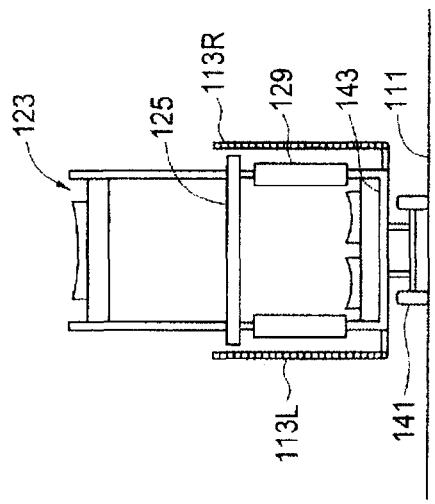
FIG. 5
FIG. 6

GRANULAR MATERIAL STORAGE WITH INPUT AND OUTPUT

FIELD OF THE INVENTION

This invention is in the field of material handling and in particular a system of silos with conveyors moving granular material into and out of the silos.

BACKGROUND OF THE INVENTION

In various industries such as agricultural commodity handling, oil and gas fracturing operations, and the like large quantities of bulk granular material must be received in a storage facility and then transferred from the facility into transport vehicles.

For example USC LLP of Sabetha, Kans. manufactures and sells a transfer system for use in handling agricultural commodities. An elevator framework is erected extending the length of a string of bins to support upper and lower rails, and a vertical bucket elevator is mounted on the rails. A lower transfer conveyor receives product from a transport vehicle and delivers same to the bottom of the bucket elevator, and an upper transfer conveyor at the top of the bucket elevator receives the product and carries same laterally to a fill hatch at the top of each bin. The bucket elevator moves along the rails to transfer product into any of the selected bins.

Typically the bins are hoppered and elevated on legs and a belt conveyor extends along the string of bins under the aligned discharge openings of the bins. The discharge opening of any selected bin can thus be opened and the contents will be carried to the end of the conveyor to be deposited in another transfer conveyor and transferred to a transport vehicle. The USC system is mainly practical for use where a permanent bulk handling facility is required, as the elevator framework must be erected and secured on a foundation to support the bucket elevator. In some situations, large quantities of bulk granular material are needed only temporarily at a work site, such as where concrete is mixed on site for a large concrete pour. U.S. Pat. No. 6,293,689 to Guntert et al. for example discloses a portable concrete batching and mixing plant comprising bins, conveyors and the like mounted on trucks for transport and temporary set up at a construction site.

Longer term temporary bulk storage facilities are often required as well, for example in newly discovered and developed oil fields fracturing of formations in newly drilled wells may take place for some months or years, requiring significant quantities of bulk granular material such as frac sand for this initial period only, and then it would be desirable to be able to conveniently and economically move the facility to another active location.

A problem with such storage facilities at some sites, such as oil well sites, is the limited space available for the facility. In temporary sites as well where the silos are not permanently anchored to the ground, wind loading on the silos, especially when empty, can cause the silos to move. The silos are typically quite high compared to the size of the base, and so there is a risk the silos may tip over in high winds.

SUMMARY OF THE INVENTION

The present disclosure provides a storage system with input and output conveyors that overcomes problems in the prior art.

In a first embodiment the present disclosure provides a bulk storage and dispensing system configured to be transported to a work site and installed on a site surface at the work site. The system comprises a plurality of transportable silos, each silo releasably secured at a bottom end thereof to a fixed silo location on the site surface, each silo comprising a lower output port and an upper input port. A conveyor assembly is releasably secured to a fixed conveyor location on the site surface adjacent to the silos, the conveyor assembly comprising a lower output conveyor apparatus, an upper input conveyor apparatus, a rigid upper frame, and a conveyor raising mechanism operative to raise the upper input conveyor apparatus and rigid upper frame from a lowered transport position to a raised operating position. The lower output conveyor apparatus is operative to receive granular material from the lower output port of each silo and discharge the granular material at a lower conveyor output, and the upper input conveyor apparatus is operative to receive granular material at an upper conveyor input when in the raised operating position and selectively direct the granular material into the upper input port of each silo. A plurality of upper silo locks is operative to lock an upper portion of each silo to the rigid upper frame of the conveyor assembly when the rigid upper frame is in the raised operating position.

In a second embodiment the present disclosure provides a method of storing and dispensing granular material at a work site. The method comprises providing a conveyor assembly comprising a lower output conveyor apparatus, an upper input conveyor apparatus, a rigid upper frame, and a conveyor raising mechanism operative to raise the upper input conveyor apparatus and rigid upper frame from a lowered transport position to a raised operating position; transporting the conveyor assembly in the transport position to the work site and releasably securing the conveyor assembly to a fixed conveyor location on the site surface; transporting a plurality of silos to the work site and releasably securing a bottom end of each silo to a fixed silo location on a site surface adjacent to the conveyor assembly, each silo comprising a lower output port and an upper input port; with the upper input conveyor apparatus and rigid upper frame in the raised operating position, locking an upper portion of each silo to the rigid upper frame of the conveyor assembly; operating the upper input conveyor apparatus to receive granular material at an upper conveyor input thereof and direct the granular material into the upper input ports of the silos; operating the lower output conveyor apparatus to receive granular material from the lower output ports of selected silos and discharge the granular material at a lower conveyor output.

Transporting a plurality of silos to the work site and releasably securing a bottom end of each silo to a fixed silo location on a site surface, each silo comprising a lower output port and an upper input port; providing a conveyor assembly comprising a lower output conveyor apparatus, an upper input conveyor apparatus, a rigid upper frame, and a conveyor raising mechanism operative to raise the upper input conveyor apparatus and rigid upper frame from a lowered transport position to a raised operating position; transporting the conveyor assembly in the transport position to the work site and releasably securing the conveyor assembly to a fixed conveyor location on the site surface adjacent to the silos; raising the upper input conveyor apparatus and rigid upper frame to the raised operating position; locking an upper portion of each silo to the rigid upper frame of the conveyor assembly; operating the upper input conveyor apparatus to receive granular material at an upper conveyor input thereof and direct the granular material into the upper input ports of selected silos; operating the lower output conveyor apparatus to receive granular material from the lower output port of selected silos and discharge the granular material at a lower conveyor output.

The present disclosure provides portable bulk storage and dispensing at a site surface that occupies a relatively small area. The capacity can be scaled up or down as required for a particular application. The conveyor assembly and silos are locked together into fixed positions with respect to each other such that the system has improved stability and resists movement due to forces exerted thereon such as by high winds.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 5 is a schematic end view of the conveyor assembly of the embodiment of FIG. 3 in the raised operating position;

FIG. 6 is an end view of the conveyor assembly of FIG. 5 in the lowered transport position;

DETAILED DESCRIPTION OF THE INVENTION

Figure 1:
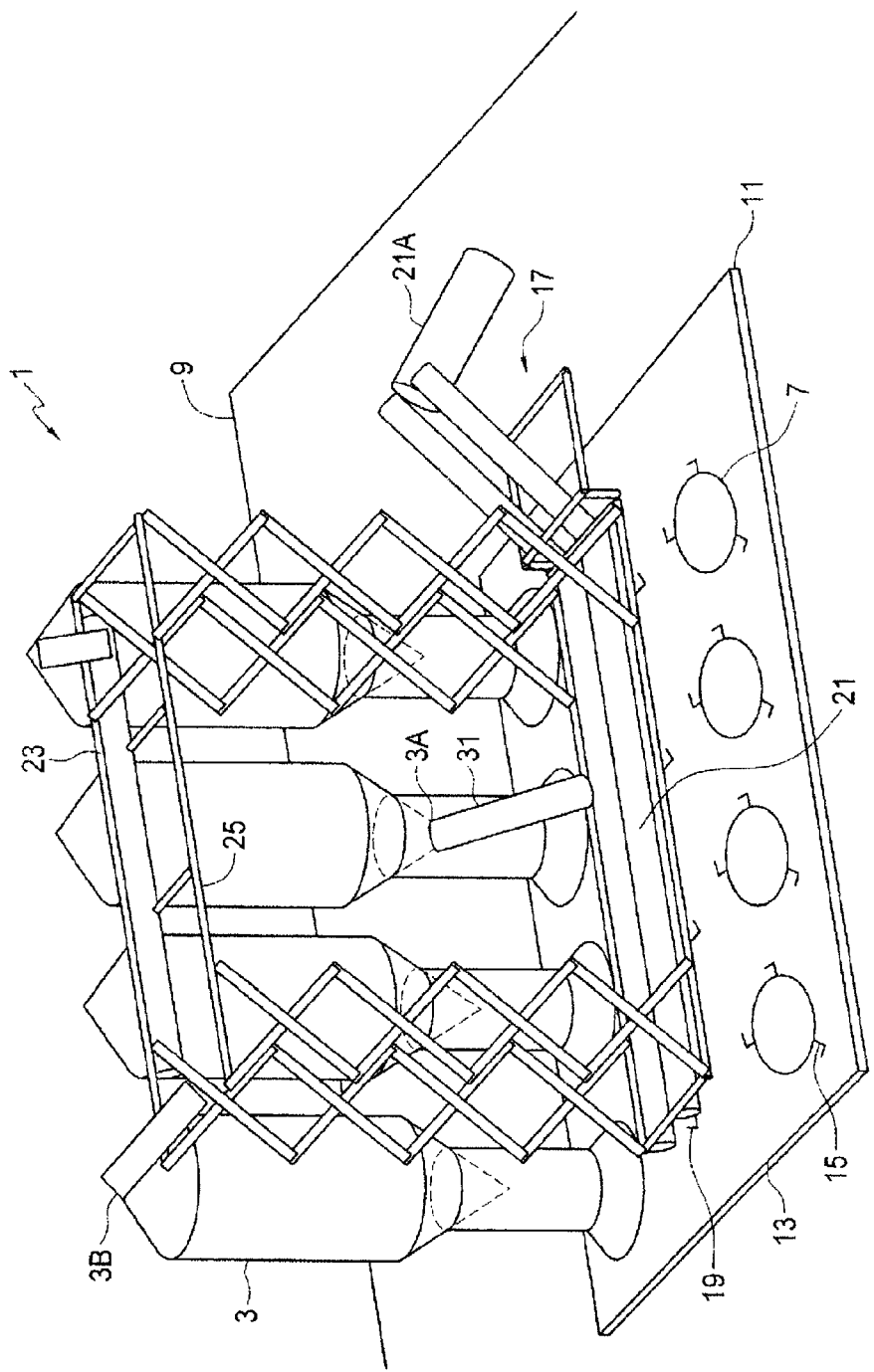
FIG. 1 is a schematic perspective view of an embodiment of a bulk storage and dispensing system of the present disclosure with bins shown only on one side of the conveyor assembly, and where the upper input conveyor apparatus is below the tops of the silos and granular material is lifted up into the input ports of the silos by conveyors.
Figure 2:
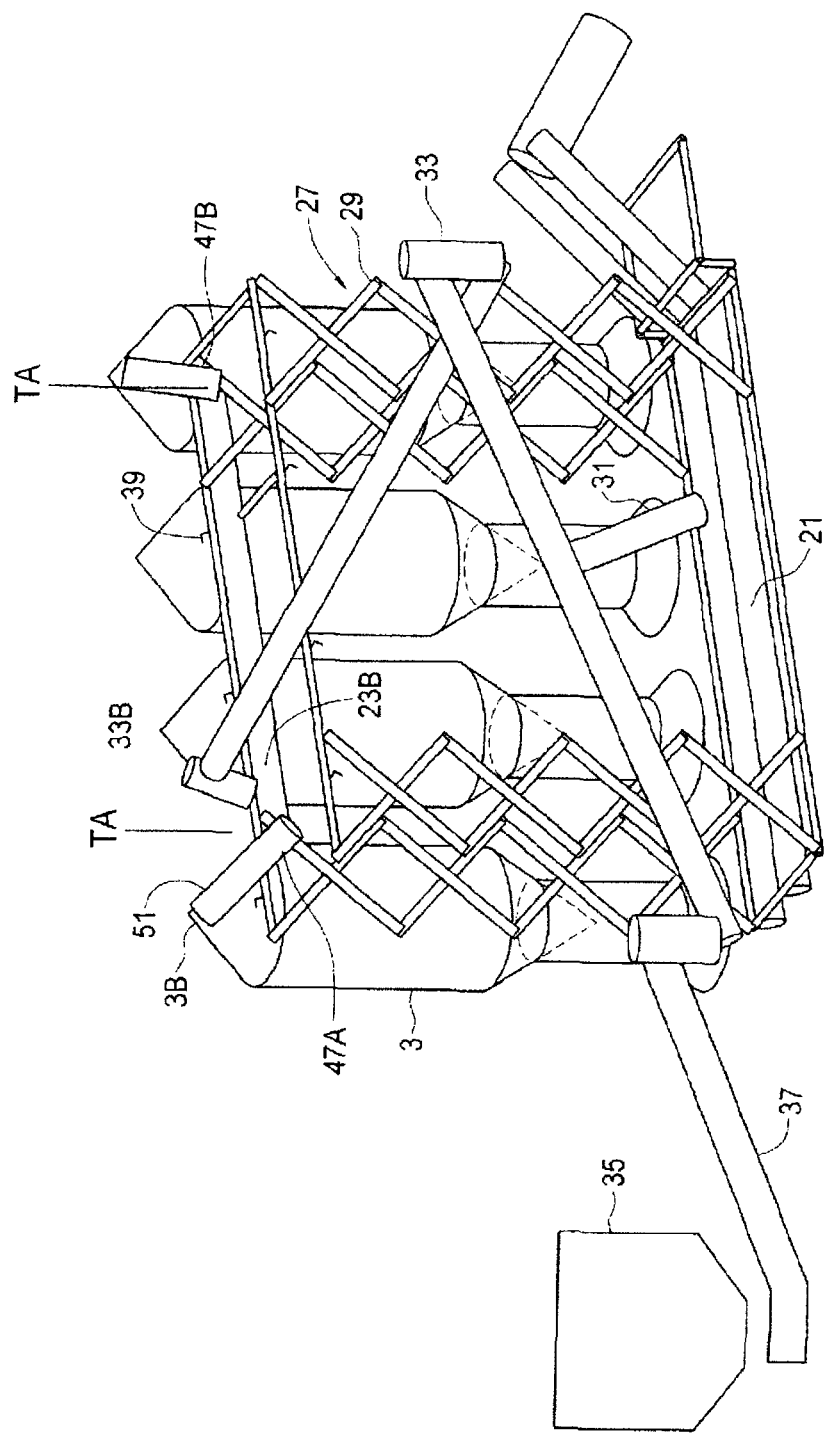
FIG. 2 is a schematic perspective view of the embodiment of FIG. 1 with a loading conveyor added as part of the conveyor assembly.

FIGS. 1 and 2 schematically illustrate an embodiment of a bulk storage and dispensing system 1 of the present disclosure. In FIGS. 1 and 2 one row of silos 3 has been removed to more clearly illustrates the conveyor assembly. The silo locations 7 of the missing row of silos 3 are indicated by the circles in FIG. 2. The system 1 is configured to be transported to a work site 9, such as an petroleum well or like site, and installed on a site surface 11 at the work site 9. It is contemplated that the system 1 would function with bins only on one side but typically silos 3 will be installed on each side of the conveyor assembly 17.

The system 1 comprises a plurality of transportable silos 3, each silo 3 releasably secured at a bottom end thereof to a fixed silo location 7 on the site surface 11. Each silo comprises a lower output port 3A for drawing granular material out of the silo 3 and an upper input port 3B for depositing granular material into the silo. To facilitate locating and securing the silos 3 in the required locations, the site surface 11 is substantially covered with a rigid base structure 13. The base structure is typically a grid of steel bars or the like with silo locks 15 attached to the base structure at the silo locations 7. The silos 3 are transported to the work site 9 by trucks as is known in the art, and maneuvered into the silo locations which are defined by the location of the silo locks 15, and then the locks 15 are operated to engage corresponding receivers on the silos 3 to releasably attach the silos to the base structure 13. The locks 15 could also be provided by recesses in the base structure 13, with either the entire bottom end of the silos 3 fitting into the recesses, or with lugs extending down from the silos into the recesses, thus preventing lateral movement of the silos 3 with respect to the base structure 13.

A conveyor assembly 17 is releasably secured to a fixed conveyor location 19 on the site surface adjacent to the silos 3. The base structure 13 can be transported to the work site 9 as described below, or the base structure 13 can be transported separately and installed on the site surface 11 prior to installing the conveyor assembly 17. In that case conveyor locks 19 can be located on the base structure 13 to position the conveyor assembly 17 in the required location relative to the silos 3 and releasably lock the conveyor assembly 17 to the base structure 13.

The conveyor assembly 17 comprises a lower output conveyor apparatus 21, an upper input conveyor apparatus 23, and a rigid upper frame 25. A conveyor raising mechanism 27 is operative to raise the upper input conveyor apparatus 23 and rigid upper frame 25 from a lowered transport position to the raised operating position shown in FIGS. 1 and 2. In the system 1 of FIGS. 1 and 2, the conveyor raising mechanism 27 is provided by scissor lift assemblies 29 on each end of the conveyor assembly 17.

The lower output conveyor apparatus 21 is operative to receive granular material from the lower output port 3A of each silo 3 and discharge the granular material at a lower conveyor output 21A. Redundancy is provided in the illustrated lower output conveyor apparatus 21 by providing side by side conveyors as is known in the art. A discharge spout 31 from each output port 3A directs granular material onto either conveyor of the lower output conveyor apparatus 21. It is contemplated that the lower output conveyor apparatus 21 could be provided by a side by side conveyor of the prior art and transported separately to the work site where it would then be incorporated into the conveyor assembly 17. In this manner the lower output conveyor apparatus 21 could be utilized in other applications if desired, thus providing increased versatility.

The upper input conveyor apparatus 23 is operative to receive granular material at an upper conveyor input 23B when in the raised operating position and selectively direct the granular material into the upper input port 3B of each silo 3. In the illustrated system 1, a loading conveyor apparatus 33 is operative to receive granular material from a transport vehicle 35 via a transfer conveyor 37 and to discharge the received granular material into the upper input conveyor apparatus 23 in the raised operating position. In the illustrated system 1 loading conveyor apparatus 33 is mounted on the conveyor assembly 17 and the discharge end 33B of the loading conveyor apparatus 33 is raised with the upper input conveyor apparatus 23 and rigid upper frame 25 as the upper input conveyor apparatus 23 and rigid upper frame 25 move from the lowered transport position to the raised operating position. It is also contemplated that the upper input conveyor apparatus 23 could be provided by a vertically oriented bucket elevator which would collapse or be leaned down to a lowered position for transport and then be moved to a vertical orientation in the raised operating position.

A plurality of upper silo locks 39 are operative to lock an upper portion of each silo to the rigid upper frame 25 of the conveyor assembly when the rigid upper frame 25 is in the raised operating position. With the bottom ends of the silos 3 and the conveyor assembly 17 all fixed to the base structure 13, once the upper portions of each silo 3 are locked to the rigid upper frame 25, all parts of the system 1 are fixed with respect to each other. There is a significantly reduced risk that high wind forces on the silos 3, even when empty, will cause movement or tipping.

Figure 3:
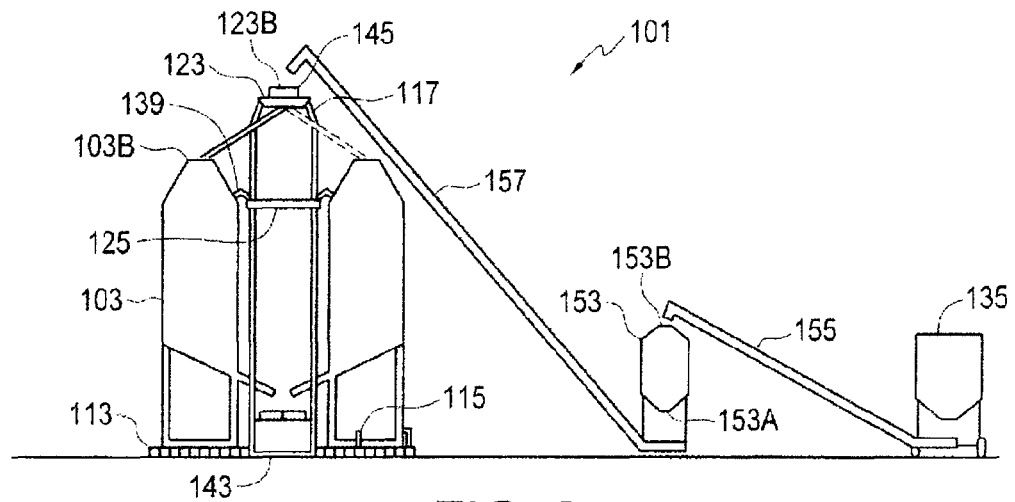
FIG. 3 is schematic end view of an alternate embodiment of a bulk storage and dispensing system of the present disclosure with bins on each side of the conveyor assembly and where the upper input conveyor apparatus is above the tops of the silos and granular material flows down into the input ports of the silos by gravity; a surge bin is also shown.
Figure 4:
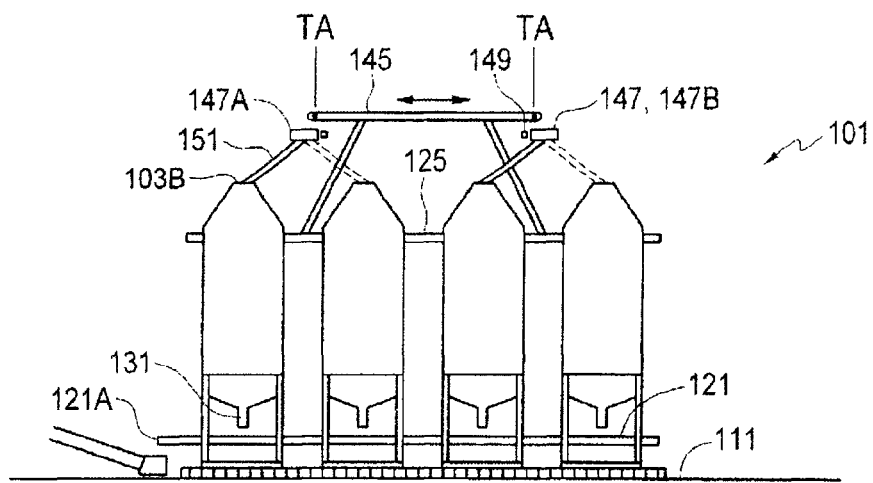
FIG. 4 is a schematic side view of the embodiment of FIG. 3.

FIGS. 3-7 schematically illustrate an alternate system 101 of the present disclosure where the upper input conveyor apparatus 123, as seen in FIGS. 3 and 4, is above the input ports 103B of the silos 103, instead of below the input ports 3B of the silos 3 as schematically illustrated in the system 1 of FIGS. 1 and 2.

Also in the system 101 the conveyor raising mechanism 127 is provided by telescoping extendable actuators 129 instead of scissor lift assemblies 29 as in the system 1 of FIGS. 1 and 2. Right and left rows of four silos 103 are located adjacent to corresponding right and left sides of the conveyor assembly 117, and the conveyor assembly 117 and silos 103 are maintained in position by attachment to the base structure 113.

In the system 101 the conveyor assembly 117 is mounted on wheels 141 and is transported to the work site on the wheels 141. Typically the conveyor assembly 117 will be towed but same could also include an engine and drive train and be self-propelled. The base structure 113 comprises right and left base sections 113R, 113L pivotally attached to corresponding right and left sides of the conveyor assembly 117 and transported to the work site with the conveyor assembly 117 on the wheels 141. Silo locks 115 are mounted to the right and left base sections 113R, 113L and define the silo locations.

In operation the conveyor assembly 117 is moved to the work site on the wheels 141 in the transport position shown in FIG. 6. Once in position the wheels 141 are raised or removed so the lower frame 143 of the conveyor assembly 117 rests on the site surface 111, and the right and left base sections 113R, 113L are pivoted down to rest on the site surface 111 in the operating position of FIG. 5 such that the base structure 113 is formed by the lower frame 143 and right and left base sections 113R, 113L. The conveyor assembly 117 is thus fixed with respect to the base structure 113, and the silos 103 are then secured in their required locations on the base structure 113 by silo locks 115, and thus in a fixed location with respect to each other and the conveyor assembly 117.

The telescoping extendable actuators 129 can be extended before or after the silos 103 are placed on the base structure, raising the upper input conveyor apparatus 123 to the raised operating position shown in FIGS. 3-5. Once in the operating position upper silo locks 139 fix upper portions of the silos 103 to the rigid upper frame 125 such that again all parts of the system 101 are fixed with respect to each other.

Figure 7:
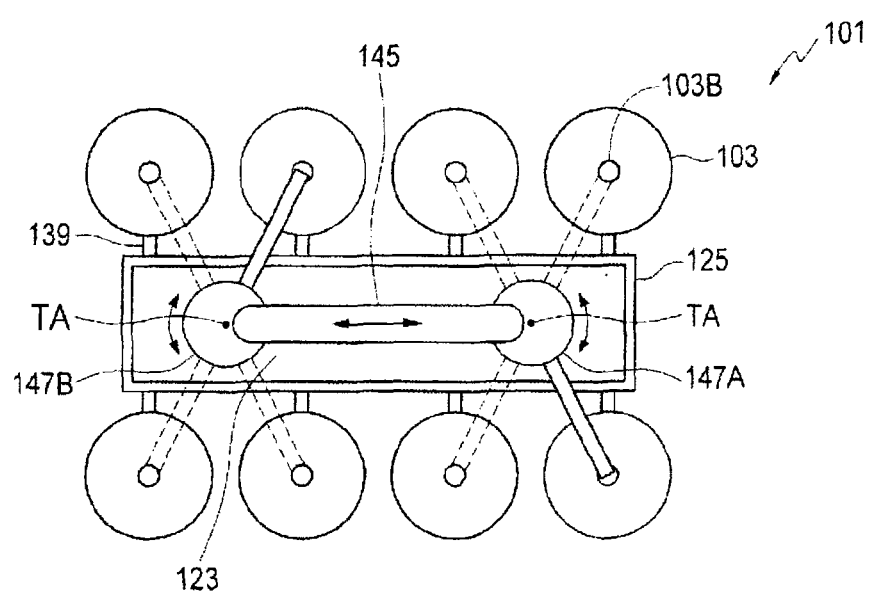
FIG. 7 is a schematic top view of the embodiment of FIG. 3.

The upper input conveyor apparatus 123 comprises a reversible upper conveyor 145 operative to discharge received granular material into a first receiver turret apparatus 147A at a first end of the upper conveyor 145 and into a second receiver turret apparatus 147B at a second end of the upper conveyor 145. Each receiver turret apparatus 147 is configured to selectively direct the granular material into the upper input port 103B of each of four silos 103 as schematically illustrated in FIG. 7. Each receiver turret apparatus 147 is rotatable about a substantially vertical turret axis TA, and includes a drive 149 operative to rotate each receiver turret apparatus about the turret axis TA.

Discharge spouts 131 from each silo 103 direct granular material onto the lower output conveyor apparatus 121 which carries same to the lower conveyor output 121A.

In the illustrated system 101, each receiver turret apparatus 147 is located equidistant from the upper input ports 103B of each of the four silos 103. The receiver turrets 147 are above the upper input ports 103B and comprise a spout 151 with a discharge end configured to discharge into the upper input ports 103B of each of the four silos 103 as shown in FIG. 7. Similarly in the system 11 of FIGS. 1 and 2, the receiver turret apparatuses 47 are below the upper input ports 3B and comprise a conveyor 51 with a discharge end configured to carry the granular material up and discharge into the upper input ports 3B of each silo 3.

To facilitate fast loading of the silos 103, the system 101 includes a surge bin 153 with a lower output port 153A and an upper input port 153B. A surge bin input conveyor 155 is operative to receive granular material from a transport vehicle 135 and discharge the received granular material into the upper input port 153B of the surge bin 153. A surge bin output conveyor 157 is operative to receive granular material from the lower output port 153 A of the surge bin 153 and operative to discharge the received granular material into the upper conveyor input 123B. The surge bin input conveyor 155 has a capacity greater than a capacity of the surge bin output conveyor 157.

The surge bin output conveyor 157 can then be operated continuously to transfer granular material from the surge bin 153 into the upper conveyor input 123B at a surge bin emptying rate while operating the surge bin input conveyor 155 to transfer granular material from a succession of different transport vehicles 135 into the surge bin 153 at surge bin filling rate that is greater than the surge bin emptying rate. Thus a continuous stream of granular material can be provided to the upper conveyor input 123B while the surge bin input conveyor 155 is stopped while changing from one transport vehicle to the next.

Figure 8:
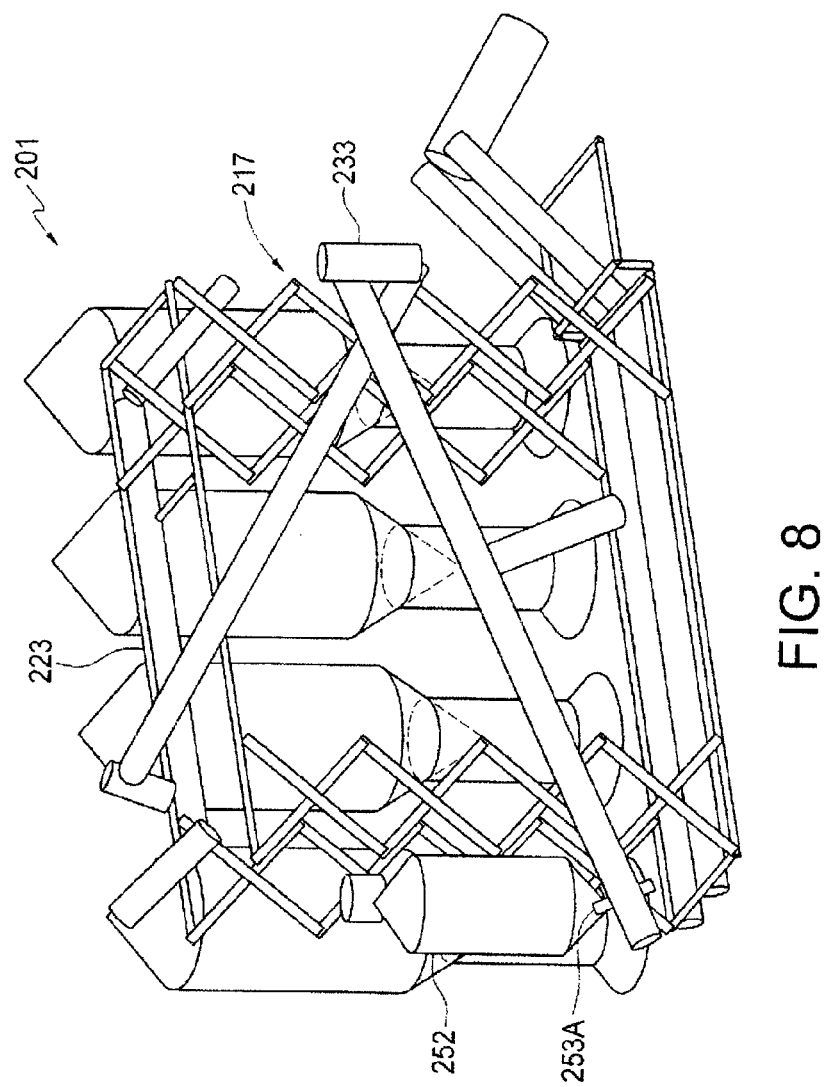
FIG. 8 is a schematic perspective view of an alternate embodiment of a bulk storage and dispensing system of the present disclosure where a surge bin is mounted on the conveyor assembly and is transported with the conveyor assembly.

It is contemplated that the surge bin 153 can be quite small compared to the silos 3. FIG. 8 schematically illustrates a bulk storage and dispensing system 201 of the present disclosure wherein the surge bin 253 is mounted to the conveyor assembly 217 and is transported to the work site with the conveyor assembly 217. The lower output port 253 A is oriented such that granular material flows into a loading conveyor apparatus 233 and is transferred into the upper input conveyor apparatus 223 in the raised operating position, The upper input conveyor apparatus 223 moves down to a lowered transport position that is just above the surge bin 253, or alternatively the surge bin 253 can be located just outside the path of the upper input conveyor apparatus 223 such that same can move downward beside the surge bin 253.

The present disclosure provides a method of storing and dispensing granular material at a work site 9. The method comprises providing a conveyor assembly 17 comprising a lower output conveyor apparatus 21, an upper input conveyor apparatus 23, a rigid upper frame 25, and a conveyor raising mechanism 27 operative to raise the upper input conveyor apparatus 23 and rigid upper frame 25 from a lowered transport position to a raised operating position; transporting the conveyor assembly 17 in the transport position to the work site 9 and releasably securing the conveyor assembly 17 to a fixed conveyor location on the site surface; transporting a plurality of silos 3 to the work site and releasably securing a bottom end of each silo 3 to a fixed silo location 7 on a site surface 11 adjacent to the conveyor assembly 17, each silo 3 comprising a lower output port 3A and an upper input port 3B; with the upper input conveyor apparatus 23 and rigid upper frame 25 in the raised operating position, locking an upper portion of each silo 3 to the rigid upper frame 25 of the conveyor assembly 17; operating the upper input conveyor apparatus 23 to receive granular material at an upper conveyor input 23B thereof and direct the granular material into the upper input ports 3B of the silos 3; operating the lower output conveyor apparatus 21 to receive granular material from the lower output ports 3A of selected silos and discharge the granular material at a lower conveyor output 21A.

The present disclosure provides portable bulk storage and dispensing at a work site that occupies a relatively small area for the capacity of the system. The conveyor assembly and silos are locked together into fixed positions with respect to each other such that the system has improved stability and resists movement in high winds.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A bulk storage and dispensing system configured to be transported to a work site and installed on a site surface at the work site, the system comprising:
    a plurality of transportable silos, each silo releasably secured at a bottom end thereof to a fixed silo location on the site surface, each silo comprising a lower output port and an upper input port;
    a conveyor assembly releasably secured to a fixed conveyor location on the site surface adjacent to the silos, the conveyor assembly comprising:
        a lower output conveyor apparatus, an upper input conveyor apparatus, and a rigid upper frame;
        a conveyor raising mechanism operative to raise the upper input conveyor apparatus and rigid upper frame from a lowered transport position, adjacent to a lower portion of each silo, to a raised operating position, adjacent to an upper portion of each silo;
    wherein the lower output conveyor apparatus is operative to receive granular material from the lower output port of each silo and discharge the granular material at a lower conveyor output;
    wherein the upper input conveyor apparatus is operative to receive granular material at an upper conveyor input when in the raised operating position and selectively direct the granular material into the upper input port of each silo; and
    a plurality of upper silo locks operative to lock an upper portion of each silo to the rigid upper frame of the conveyor assembly when the rigid upper frame is in the raised operating position.

2. The system of claim 1 comprising a loading conveyor apparatus operative to receive granular material from a transport vehicle and operative to discharge the received granular material into the upper input conveyor apparatus in the raised operating position.

3. The system of claim 2 wherein the loading conveyor apparatus is mounted on the conveyor assembly, and wherein a discharge end of the loading conveyor apparatus is raised with the upper input conveyor apparatus and rigid upper frame as the upper input conveyor apparatus and rigid upper frame move from the lowered transport position to the raised operating position.

4. The system of claim 1 wherein the site surface is substantially covered with a rigid base structure, and wherein the silos are releasably attached to the base structure.

5. The system of claim 4 wherein the conveyor assembly is releasably attached to the base structure.

6. The system of claim 4 wherein the base structure is pivotally attached to the conveyor assembly and transported to the work site with the conveyor assembly.

7. The system of claim 1 wherein the conveyor assembly is mounted on wheels and is transported to the work site on the wheels.

8. The system of claim 1 comprising right and left rows of silos adjacent to corresponding right and left sides of the conveyor assembly.

9. The system of claim 1 wherein the upper input conveyor apparatus comprises a reversible upper conveyor operative to discharge received granular material into a first receiver turret apparatus at a first end of the upper conveyor and into a second receiver turret apparatus at a second end of the upper conveyor, each receiver turret apparatus configured to selectively direct the granular material into the upper input port of each of a plurality of silos.

10. The system of claim 9 wherein each receiver turret apparatus is rotatable about a substantially vertical turret axis, and comprising a drive operative to rotate each receiver turret apparatus about the turret axis.

11. The system of claim 10 wherein the axis of each receiver turret apparatus is located equidistant from the upper input ports of each of the plurality of silos.

12. The system of claim 11 wherein the receiver turret apparatuses are below the upper input ports and comprise a conveyor with a discharge end configured to discharge into the upper input ports.

13. The system of claim 11 wherein the receiver turrets are above the upper input ports and comprise a spout with a discharge end configured to discharge into the upper input ports.

14. The system of claim 1 further comprising:
    a surge bin with a lower output port and an upper input port;
    a surge bin input conveyor operative to receive granular material from a transport vehicle and operative to discharge the received granular material into the upper input port of the surge bin;
    a surge bin output conveyor operative to receive granular material from the lower output port of the surge bin and operative to discharge the received granular material into the upper conveyor input;
    wherein the surge bin input conveyor has a capacity greater than a capacity of the surge bin output conveyor.

15. The system of claim 14 wherein the surge bin is mounted to the conveyor assembly and is transported to the work site with the conveyor assembly.

16. The system of claim 1 wherein the conveyor raising mechanism comprises one of a scissor lift and a telescoping extendable actuator.

17. A method of storing and dispensing granular material at a work site, the method comprising:
  providing a conveyor assembly comprising a lower output conveyor apparatus, an upper input conveyor apparatus, a rigid upper frame, and a conveyor raising mechanism operative to raise the upper input conveyor apparatus and rigid upper frame from a lowered transport position, adjacent to a lower portion of each silo, to a raised operating position, adjacent to an upper portion of each silo;
  transporting the conveyor assembly in the transport position to the work site and releasably securing the conveyor assembly to a fixed conveyor location on the site surface;
  transporting a plurality of silos to the work site and releasably securing a bottom end of each silo to a fixed silo location on a site surface adjacent to the conveyor assembly, each silo comprising a lower output port and an upper input port;
  with the upper input conveyor apparatus and rigid upper frame in the raised operating position adjacent to an upper portion of each silo, locking an upper portion of each silo to the rigid upper frame of the conveyor assembly;
  operating the upper input conveyor apparatus to receive granular material at an upper conveyor input thereof and direct the granular material into the upper input ports of the silos;
  operating the lower output conveyor apparatus to receive granular material from the lower output ports of selected silos and discharge the granular material at a lower conveyor output.

18. The method of claim 17 comprising receiving granular material from a transport vehicle with a loading conveyor apparatus operative to discharge the received granular material into the upper input conveyor apparatus.

19. The method of claim 18 wherein the conveyor assembly includes the loading conveyor apparatus, and wherein a discharge end of the loading conveyor apparatus is raised with the upper input conveyor apparatus and rigid upper frame as the upper input conveyor apparatus and rigid upper frame move from the lowered transport position to the raised operating position.

20. The method of claim 17 comprising covering the site surface with a rigid base structure prior to securing the silos and conveyor assembly, and releasably attaching the silos to the base structure.

21. The method of claim 20 comprising releasably attaching the conveyor assembly to the base structure.

22. The method of claim 20 comprising pivotally attaching the base structure to the conveyor assembly, transporting the base structure to the work site with the conveyor assembly, and pivoting the base structure down from the conveyor assembly such that the base structure extends laterally from the conveyor assembly along the site surface.

23. The method of claim 17 wherein the conveyor assembly is mounted on wheels and is transported to the work site on the wheels.

24. The method of claim 17 comprising right and left rows of silos adjacent to corresponding right and left sides of the conveyor assembly.

25. The method of claim 17 further comprising:
  transporting a surge bin to the work site;
  transporting a surge bin input conveyor and a surge bin output conveyor to the work site;
  operating the surge bin input conveyor to transfer granular material from a transport vehicle into the surge bin at surge bin filling rate;
  operating the surge bin output conveyor to transfer granular material from the surge bin into the upper conveyor input at a surge bin emptying rate that is less than the surge bin filling rate.

26. The method of claim 25 comprising operating the surge bin output conveyor continuously to transfer granular material from the surge bin into the upper conveyor input at a surge bin emptying rate while operating the surge bin input conveyor to transfer granular material from a succession of different transport vehicles into the surge bin at surge bin filling rate that is greater than the surge bin emptying rate.

27. The method of claim 25 comprising mounting the surge bin on the conveyor assembly and transporting the surge bin to the work site with the conveyor assembly.

* * * * *